F. L. DOBBYN.
SPACING INSTRUMENT.
APPLICATION FILED NOV. 1, 1918.
1,307,188.
Patented June 17, 1919.
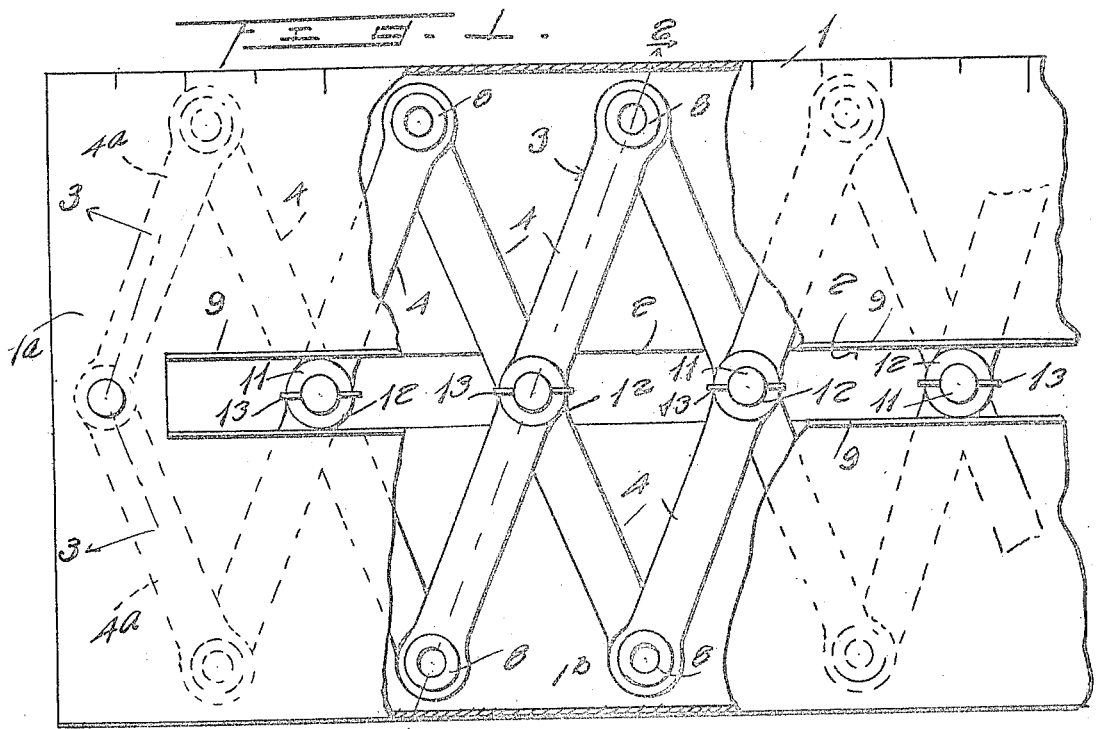
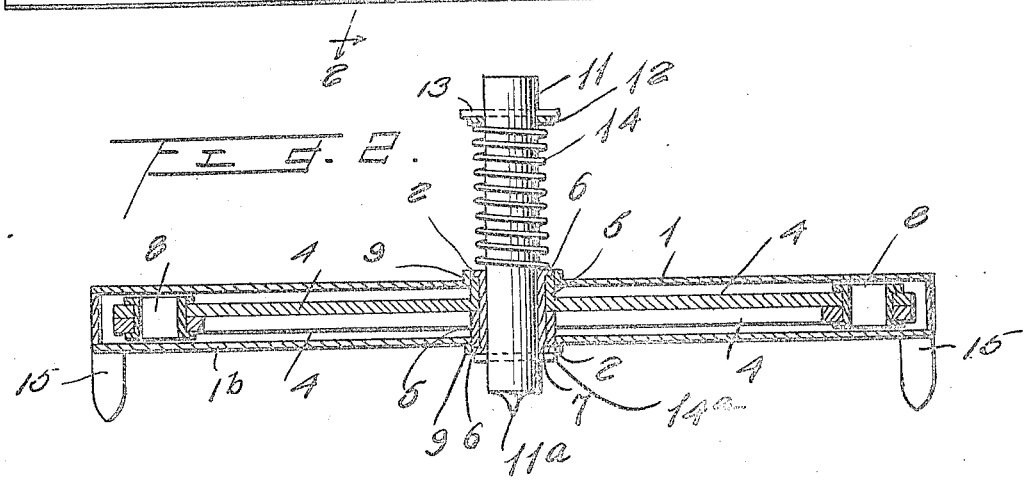
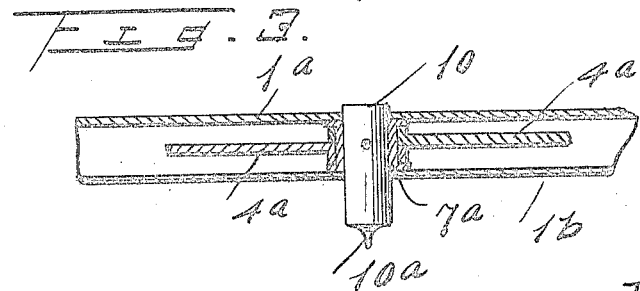
Inventor
F. L. DOBBYN,
By
Attorney

UNITED STATES PATENT OFFICE.

FRANK L. DOBBYN, OF SUPERIOR, WISCONSIN.

SPACING INSTRUMENT.

1,307,188.

Specification of Letters Patent. Patented June 17, 1919.

Application filed November 1, 1918. Serial No. 260,685.

*To all whom it may concern:*

Be it known that I, FRANK L. DOBBYN, a citizen of the United States, residing at Superior, in the county of Douglas and State of Wisconsin, have invented certain new and useful Improvements in Spacing Instruments; and I do hereby declare the following to be a full, clear, and exact description of the invention, such as will enable others skilled in the art to which it appertains to make and use the same.

This invention relates to spacing instruments, and more particularly to an instrument especially adapted for use in riveting operations.

One of the main objects of the invention is to provide an instrument by means of which the points at which to bore holes for receiving rivets in riveting operations may be readily and easily marked in proper spaced relation.

A further object is to provide an instrument comprising an extensible spacing frame carrying a plurality of punches which are mounted in predetermined relation, the spaces between these punches being varied in accordance with extension of the frame and the punches being adapted to make marks upon ship plates and other steel surfaces for indicating the points at which rivet holes should be bored.

A further object is to provide an instrument in which a measuring frame is inclosed within a casing, this casing being graduated to provide a scale by means of which the distance apart of the various punches may be accurately determined.

Further objects will appear from the detailed description.

In the drawings:—

Figure 1 is a top plan view of a rivet spacing instrument constructed in accordance with my invention partly broken away to show the interior construction, Fig. 2 is a section taken substantially on line 2—2 of Fig. 1, Fig. 3 is a section taken substantially on line 3—3 of Fig. 1.

In constructing my instrument I employ a sheet metal casing designated generally by 1 of rectangular cross section, this casing being provided in its top and bottom walls with longitudinally extending alined slots 2 positioned centrally thereof. This casing is adapted to contain the measuring or spacing instrument designated generally by 3. This instrument is of lazy-tong construction comprising a plurality of arms 4 which are disposed in superposed relation in pairs. Each arm 4 is provided at its longitudinal center with an eye having an outwardly directed peripheral flange 5 which fits snugly against an outwardly projecting peripheral end flange 6 of a sleeve 7 fitting snugly through the central portion of the arms 4 of each pair. The outer ends of the arms of the successive sets or pairs of arms are pivotally secured together by a flanged thimble 8 as in Fig. 2. As will be noted, the flanges 5 at the central portions of each pair of arms 4 are adapted to fit snugly between the outwardly directed shoulders or flanges 9 formed adjacent each edge of the slots 2 by turning the material of the casing 1 outwardly at right angles. The flanges of the casing constitute guide members which insure accurate operation of the device when extended or contracted, the sleeve 7 sliding in the slots and being held against play or looseness by engagement of flanges 5 with flanges 9. In this manner, the lazy tong structure may be readily extended or contracted, the sleeves 7 being moved longitudinally of the casing, and at all times, spaced equidistant from each other.

A pair of short arms 4ª is provided at one end of the lazy tong structure and these arms have their inner ends rockably mounted about a sleeve 7ª in which is secured a securing pin 10 which projects through the top wall 1ª and bottom wall 1ᵇ of the casing, this pin being provided on its lower end with a suitable point 10ª. By placing the point 10ª of pin 10 upon a starting point on a straight line upon which it is desired to lay off the spaces for the rivet holes and then extending the lazy tong structure so as to move the punches 11 which are carried by the sleeves 7 the required distance apart from each other, and then striking the punches lightly with a hammer, the points at which the rivet holes are to be bored may be readily marked off. For this purpose the upper surface of the casing 1 is graduated in inches and fractions thereof, as illustrated, to provide a measuring scale. As the straight line connecting the points of intersection of any pair of the arms 4 will at all times pass through the center of the punch carried by this particular pair of arms, the distance which the punches are spaced apart may be readily ascertained from the scale. Preferably, though not necessarily, the casing 1 should be of such length as to permit the lazy tong structure to be extended to its full length thus facilitating the marking off of the riveting points.

As will be noted more clearly from Fig. 3, each punch 11 is of cylindrical shape and is provided at its lower end with a suitable point 11ª for marking upon the ship plates or other objects in connection with which the instrument is used, when struck lightly with a hammer. A disk 12 is mounted about the punch adjacent the upper end thereof. Upward movement of this disk on the punch is positively limited by a pin 13, which is inserted through the punch diametrically thereof and projects above the disk. An expansion coil spring 14 is mounted about the punch and confined between disk 12 and the upper end of sleeve 7. This spring acts to normally hold the punch in raised position, upward movement of the punch through the sleeve being positively limited by a stop pin 14ª inserted through the punch below the sleeve. When the lazy tong structure has been extended manually so as to have the punches spaced the proper distance apart, these punches are then struck lightly with a hammer so as to be forced inwardly into contact with the material being acted upon. The casing 1 is provided adjacent each corner of its other end, with spacing members or lugs 15 projecting from bottom 1ᵇ. These lugs coöperate with the pin 10ª to provide a three point support for normally holding the points 11ª of the punch 11 spaced away from the supporting surface of the casing thus permitting the casing to be readily moved into proper position to bring the points of the punches above the line upon which it is desired to mark the points for boring the rivet holes. When the casing has been moved into proper position, the lazy tong structure is extended and the points marked upon the line in the manner above described. When not in use, the lazy tong structure may be folded or contracted so as to occupy but little space and is effectually protected by the casing 1. Also, as will be noted from Fig. 3, the thimbles 8 which serve to pivotally secure together the outer ends of arms 4, are of such length as to fit snugly between the upper and lower plates of the casing, thus effectually preventing all looseness or play of these arms and insuring accurate operation of the lazy tong structure.

It will be evident that there may be slight changes made in the construction and arrangement of the details of my invention without departing from the field and scope of the same, and I intend to include all such variations, as fall within the scope of the appended claims, in this application in which a preferred form only of my invention is disclosed.

What is claimed is:

1. In an instrument of the character described, a lazy tong structure including a plurality of arms disposed in pairs in superposed relation, the arms of each pair being pivotally secured together at their point of intersection and the arms of the succeeding pairs being pivotally connected at their outer ends, and a plurality of marking elements carried by the pairs of arms of said structure and movable axially of the pivotal connection thereof for marking upon a supporting surface over which said structure is positioned, said marking elements being movable independently of said arms.

2. In an instrument of the character described, a lazy tong structure including pairs of arms disposed in superposed relation, sleeves pivotally secured to the arms of each pair so as to permit relative rocking movement thereof, the arms of the successive pairs of arms being pivotally secured together at their outer ends, and marking punches slidable through said sleeves for marking upon a supporting surface above which the said lazy tong structure is positioned.

3. In an instrument of the character described, a lazy tong structure including pairs of arms pivotally connected at their outer ends, the arms of each pair being mounted in superposed relation, connecting sleeves loosely secured through each pair of arms at the point of intersection thereof, punches slidable through said sleeve for marking upon a supporting surface above which the lazy tong structure is mounted, and means for normally holding said punches in raised position so as to permit free movement of the lazy tong structure over the supporting surface therefor.

4. In an instrument of the character described, a lazy tong structure including pairs of arms pivotally connected at their outer ends, the arms of each pair being risposed in superposed relation, sleeves loosely secured through the arms of each pair of arms at the point of intersection thereof, punches slidable through said sleeves, said punches having their outward movement through the sleeves positively limited, and means for normally holding the punches in raised position so as to permit free movement of the lazy tong structure over the supporting surface therefor.

5. In an instrument of the character stated, a casing provided in its upper and lower walls with alined longitudinally extending slots, a lazy tong structure fitting within said casing and including pairs of arms pivotally connected at their outer ends, the arms of each pair being disposed in superposed relation, connecting sleeves loosely secured through each pair of arms at the point of intersection thereof and positioned in alinement with said slots, one end of the lazy tong structure being secured to the casing adjacent one end thereof, marking punches carried by said sleeves and slidable therethrough, outward movement of the punches through the sleeves being positively limited, means for normally holding the punches in raised position, and means carried by the casing for supporting the same in spaced relation to the supporting surface so as to normally hold the marking punches out of engagement with this surface and permit free movement of the casing over the same.

In testimony whereof I affix my signature in presence of two witnesses.

FRANK L. DOBBYN.

Witnesses:
SADIE B. WEST,
MARGARET M. HOIT.